United States Patent
Kim

(10) Patent No.: US 9,766,072 B2
(45) Date of Patent: Sep. 19, 2017

(54) METHOD AND DEVICE FOR PROVIDING TRAVEL ROUTE OF MOBILE MEDICAL DIAGNOSIS APPARATUS

(71) Applicant: SAMSUNG ELECTRONICS CO., LTD, Suwon-si, Gyeonggi-do (KR)

(72) Inventor: Myeong-je Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/133,015

(22) Filed: Dec. 18, 2013

(65) Prior Publication Data

US 2014/0372037 A1 Dec. 18, 2014

(30) Foreign Application Priority Data

Jun. 18, 2013 (KR) .................. 10-2013-0069957

(51) Int. Cl.
*G01C 21/00* (2006.01)
*B62D 15/02* (2006.01)

(52) U.S. Cl.
CPC ......... *G01C 21/00* (2013.01); *B62D 15/0295* (2013.01); *G01C 21/005* (2013.01)

(58) Field of Classification Search
CPC ................ B62D 15/0295; G06K 9/00791; G06T 15/20; G08G 1/16
USPC ............ 701/23, 28, 301, 302, 400, 410, 541
See application file for complete search history.

(56) References Cited

U.S. PATENT DOCUMENTS

| | | | | |
|---|---|---|---|---|
| 5,122,957 A | * | 6/1992 | Hattori | G05D 1/0221 382/153 |
| 5,243,528 A | * | 9/1993 | Lefebvre | G01C 21/367 340/990 |
| 5,446,445 A | * | 8/1995 | Bloomfield | G08B 17/10 340/521 |
| 7,957,837 B2 | * | 6/2011 | Ziegler | B25J 5/007 318/568.1 |
| 8,989,972 B2 | * | 3/2015 | Anderson | A61B 5/6804 701/301 |
| 2002/0146173 A1 | * | 10/2002 | Herley | H04N 1/00681 382/199 |

(Continued)

FOREIGN PATENT DOCUMENTS

| | | |
|---|---|---|
| JP | 11-16057 | 1/1999 |
| JP | 2004-313587 | 11/2004 |

(Continued)

OTHER PUBLICATIONS

European Search Report issued Feb. 10, 2015 in corresponding European Patent Application No. 14160012.2.

(Continued)

*Primary Examiner* — Khoi Tran
*Assistant Examiner* — Jorge Peche
(74) *Attorney, Agent, or Firm* — Staas & Halsey LLP

(57) ABSTRACT

A method and device for providing a travel route of a portable medical diagnosis apparatus include acquiring a travel image obtained by capturing a space to move of the medical diagnosis apparatus; predicting the travel route of the medical diagnosis apparatus on the basis of a steering angle of the medical diagnosis apparatus; and displaying information regarding the travel route on the travel image.

22 Claims, 11 Drawing Sheets

(56) References Cited

U.S. PATENT DOCUMENTS

| | | | | |
|---|---|---|---|---|
| 2003/0083850 | A1* | 5/2003 | Schmidt | G06T 7/001 702/189 |
| 2003/0216880 | A1* | 11/2003 | Endoh | G08G 1/01 702/122 |
| 2004/0153243 | A1* | 8/2004 | Shimazaki | B62D 15/0275 701/300 |
| 2005/0012745 | A1* | 1/2005 | Kondo | G06T 3/0062 345/427 |
| 2005/0276446 | A1* | 12/2005 | Chen | G06K 9/00771 382/103 |
| 2007/0159354 | A1* | 7/2007 | Rosenberg | G08G 1/0965 340/902 |
| 2007/0192910 | A1* | 8/2007 | Vu | B25J 5/007 700/245 |
| 2007/0211919 | A1* | 9/2007 | Nagaoka | G06K 9/00369 382/104 |
| 2008/0016172 | A1 | 1/2008 | Schiavone et al. | |
| 2008/0137159 | A1* | 6/2008 | Lim | H04N 1/40062 358/520 |
| 2008/0300745 | A1* | 12/2008 | Goossen | G05D 1/0044 701/25 |
| 2009/0153662 | A1* | 6/2009 | Abel | G02B 23/12 348/148 |
| 2009/0179912 | A1* | 7/2009 | Hashizume | G01C 21/367 345/611 |
| 2010/0063663 | A1* | 3/2010 | Tolstedt | G05D 1/0231 701/23 |
| 2012/0016555 | A1* | 1/2012 | Ghneim | B62D 15/0275 701/41 |
| 2012/0093362 | A1* | 4/2012 | Liu | G06K 9/00771 382/103 |
| 2012/0314918 | A1* | 12/2012 | Nakamura | A61B 5/1172 382/124 |
| 2013/0147945 | A1* | 6/2013 | Watanabe | H04N 7/18 348/118 |
| 2014/0085474 | A1* | 3/2014 | Lee | B62D 15/0275 348/148 |
| 2014/0285667 | A1* | 9/2014 | Aimura | G08G 1/166 348/148 |
| 2014/0324269 | A1* | 10/2014 | Abramson | G05D 1/0265 701/26 |
| 2015/0042799 | A1* | 2/2015 | Zhang | H04N 7/18 348/148 |
| 2015/0062141 | A1* | 3/2015 | Hayasaka | B60R 1/00 345/581 |
| 2015/0217693 | A1* | 8/2015 | Pliefke | B60R 1/00 348/118 |
| 2016/0117840 | A1* | 4/2016 | Yamamoto | G06T 7/215 382/103 |
| 2016/0207538 | A1* | 7/2016 | Urano | B60W 30/182 |

FOREIGN PATENT DOCUMENTS

| | | | |
|---|---|---|---|
| JP | 2008-302116 | | 12/2008 |
| JP | 2009-178361 | | 8/2009 |
| JP | 2009-183368 | | 8/2009 |
| JP | 2009178361 | A * | 8/2009 |
| JP | 2011-28609 | | 2/2011 |
| KR | 10-2011-0136218 | | 12/2011 |
| KR | 10-2012-0114916 | | 10/2012 |
| KR | WO 2012153978 | A2 * | 11/2012 ......... B62D 15/0275 |

OTHER PUBLICATIONS

Korean Office Action dated Nov. 5, 2015 in corresponding Korean Patent Application No. 10-2013-0069957.
Korean Office Action dated Jan. 4, 2016 in corresponding Korean Patent Application No. 10-2013-0069957.
Korean Office Action mailed May 19, 2015 in corresponding Korea Application No. 2013-0069957.
Yun-Hee Lee, et al., "Stereo Vision Based Forward Obstacle Distance Monitoring System", pp. 1181-1187 (Nov. 2005).
European Office Action dated Feb. 3, 2016 in corresponding European Patent Application No. 14160012.2.

* cited by examiner

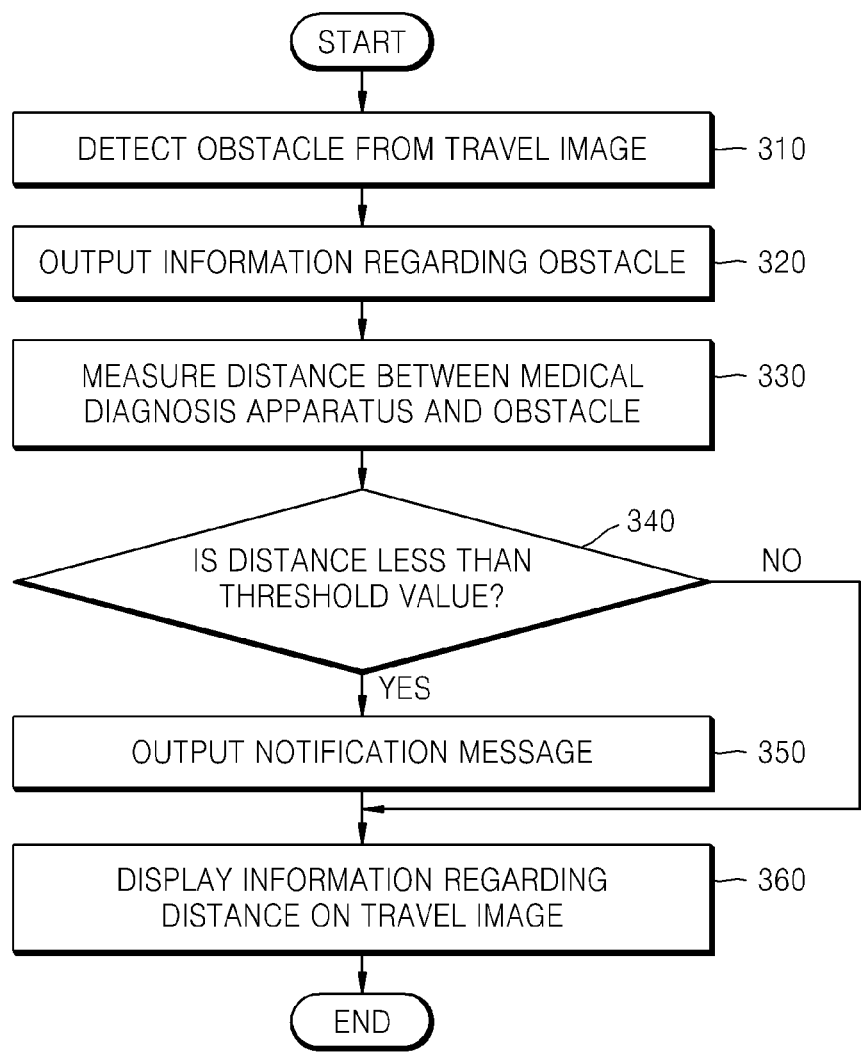

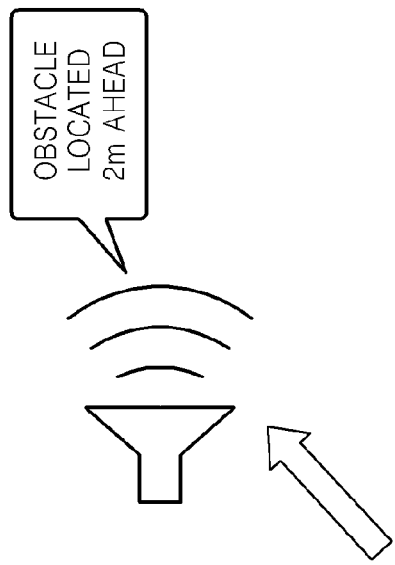
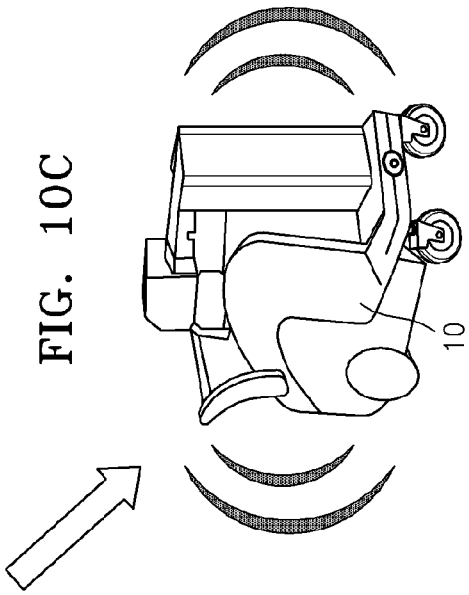
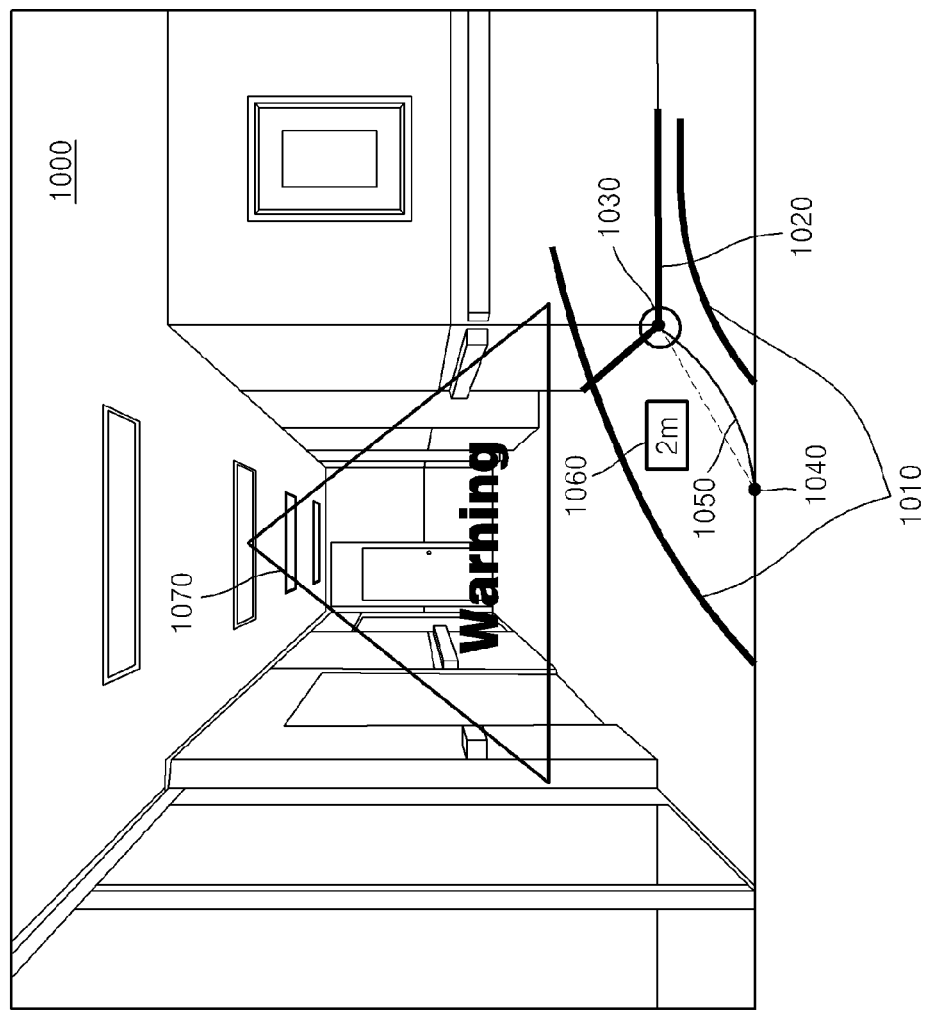

FIG. 12A
FIG. 12B
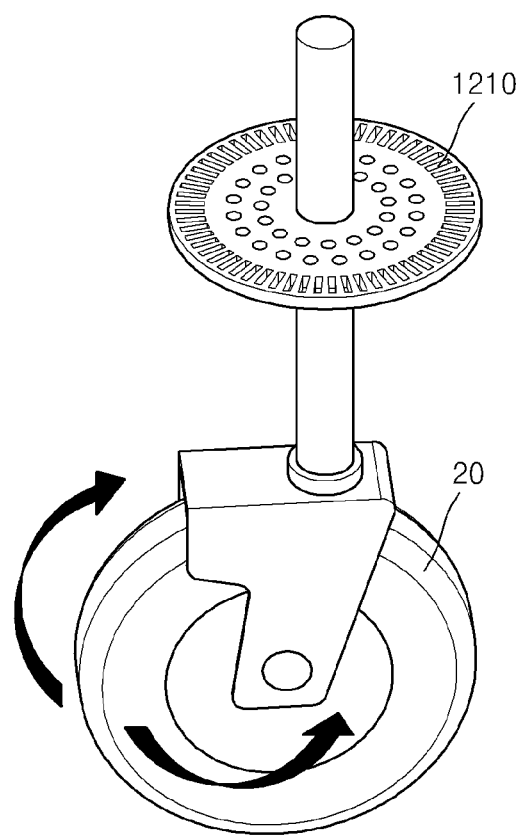
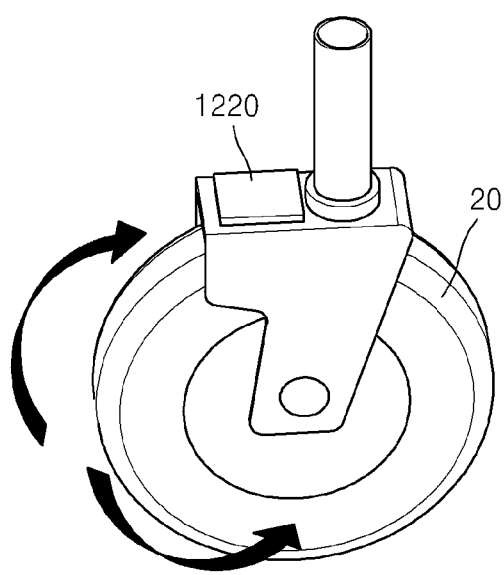

METHOD AND DEVICE FOR PROVIDING TRAVEL ROUTE OF MOBILE MEDICAL DIAGNOSIS APPARATUS

CROSS-REFERENCE TO RELATED APPLICATIONS

This application claims the benefit of Korean Patent Application No. 10-2013-0069957, filed on Jun. 18, 2013, in the Korean Intellectual Property Office, the disclosure of which is incorporated herein in its entirety by reference.

BACKGROUND

1. Field

One or more embodiments relate to a method and device for predicting and providing a travel route of a portable medical diagnosis apparatus.

2. Description of the Related Art

Medical diagnosis apparatuses diagnose an object using various physical phenomena such as X-rays, a magnetic field, or ultrasonic waves. In addition, the medical diagnosis apparatus may be configured not only to be fixed to an operating room, but also to be portable, including a moving device. In the case of a portable medical diagnosis apparatus, a user may not be able to view a moving route of the portable medical diagnosis apparatus due to the size of the portable medical diagnosis apparatus.

SUMMARY

Additional aspects and/or advantages of one or more embodiments will be set forth in part in the description which follows and, in part, will be apparent from the description, or may be learned by practice of one or more embodiments of disclosure. One or more embodiments are inclusive of such additional aspects.

One or more embodiments relate to a method and device for providing information regarding a travel route of a portable medical diagnosis apparatus.

One or more embodiments relate to a non-transitory computer-readable recording medium having embodied thereon a computer program for executing the method.

The foregoing described problems may be overcome and/or other aspects may be achieved by one or more embodiments of a method of providing a travel route of a medical diagnosis apparatus which is portable, the method possibly including acquiring a travel image obtained by capturing a space to move of the medical diagnosis apparatus; predicting the travel route of the medical diagnosis apparatus on the basis of a steering angle of the medical diagnosis apparatus; and displaying information regarding the travel route on the travel image in an overlapping manner.

The method may further include detecting an obstacle related to the travel route from the travel image; and displaying information regarding the obstacle on the travel image.

The detecting of the obstacle may include detecting the obstacle on the basis of color values of a plurality of pixels included in the travel image.

The detecting of the obstacle on the basis of the color values may include detecting pixels in which a difference in color value between the adjacent pixels is equal to or greater than a predetermined threshold value, in the plurality of pixels.

The method may further include measuring a distance between the medical diagnosis apparatus and the obstacle; and displaying information regarding the measured distance on the travel image.

The measuring of the distance may include measuring the distance on the basis of the number of the pixels located between the medical diagnosis apparatus and the obstacle, in the travel image.

The measuring of the distance may include measuring the distance on the basis of image capture angles of two cameras that capture an image of the space to move.

The method may further include outputting a notification message indicating that the medical diagnosis apparatus has approached the obstacle when the distance is less than the predetermined threshold value.

The predicting of the travel route may include predicting the travel route as a straight-line route when the steering angle is within a predetermined threshold section.

The steering angle may be measured using at least one of a rotary encoder and a gyroscope sensor which are provided around a moving device of the medical diagnosis apparatus The predicting of the travel route may include determining a width of the travel route on the basis of a size of the medical diagnosis apparatus.

The foregoing described problems may be overcome and/or other aspects may be achieved by one or more embodiments of a device for providing a travel route of a medical diagnosis apparatus that is portable, the device possibly comprising: an image capturer for capturing an image of a space in which the medical diagnosis apparatus may move; an image processor for acquiring a travel image obtained by capturing the space; angle measurer for measuring a steering angle of the medical diagnosis apparatus; a route predictor for predicting the travel route of the medical diagnosis apparatus on the basis of the steering angle; and an output for displaying information regarding the travel route on the travel image in an overlapping manner.

The foregoing described problems may be overcome and/or other aspects may be achieved by one or more embodiments of a computer-readable recording medium having embodied thereon a computer program for executing the method.

BRIEF DESCRIPTION OF THE DRAWINGS

These and/or other aspects will become apparent and more readily appreciated from the following description of embodiments, taken in conjunction with the accompanying drawings of which:

FIG. 3 is a flowchart illustrating a travel route providing method according to one or more embodiments;

FIGS. 10A to 10C are diagrams illustrating an example of outputting a notification message when a distance having a value equal to or less than a threshold value is measured, according to one or more embodiments;

FIGS. 12A and 12B are diagrams illustrating an example of a moving device and an angle measurer, according to one or more embodiments.

DETAILED DESCRIPTION

Figure 1:
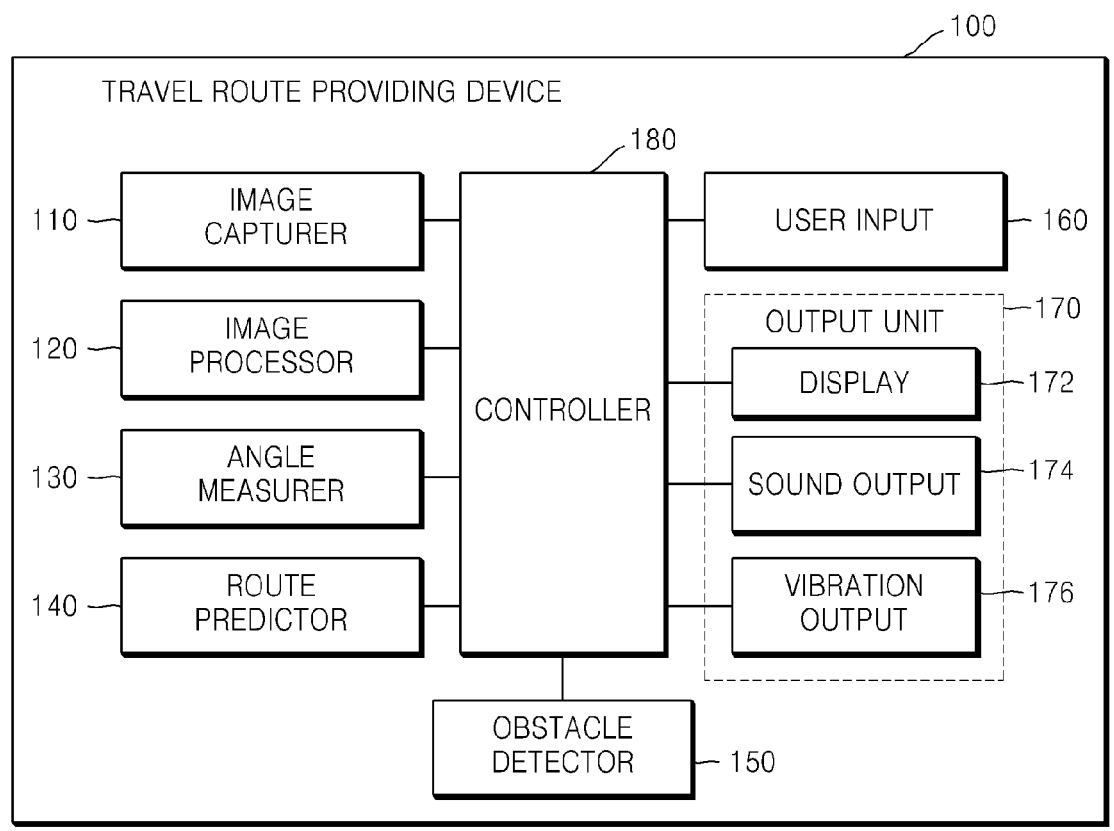
FIG. 1 is a block diagram illustrating a configuration of a travel route providing device according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein, as various changes, modifications, and equivalents of the systems, apparatuses and/or methods described herein will be understood to be included in the invention by those of ordinary skill in the art after embodiments discussed herein are understood. Accordingly, embodiments are merely described below, by referring to the figures, to explain aspects of the present invention.

Terms used hereinafter are used considering the functions in the present invention and may be changed according to a user's or operator's intention, usual practice, or development of new technology. Also, some terms may be arbitrarily selected by the applicant, and in this case, the meaning of the terms will be explained in detail. Accordingly, the terms will be defined based on the entire content of the description of the present invention.

In the specification, the term "image" may mean multi-dimensional data constituted by discrete image elements (for example, pixels in a two-dimensional image or voxels in a three-dimensional (3D) image). For example, the term "image" may include X-rays, CT, MRI, ultrasonic waves, and a medical image of an object which is acquired by another medical diagnosis system.

In addition, in the specification, the term "object" may include a human, an animal, or a part of the animal. For example, the term "object" may include an organ such as a liver, a heart, a womb, a brain, a breast, or an abdomen, or an embryo. Also, the term "object" may include a phantom. The phantom means a material having a volume that is extremely approximate to the intensity and effective atomic number of a living thing, and may include a sphere phantom having a property similar to a human body.

The term "user" herein is, but is not limited to, a medical expert, such as a surgeon, a nurse, a clinical pathologist, a medical image expert, a radiological technologist, or an engineer who repairs a medical device.

FIG. 1 is a block diagram illustrating a configuration of a travel route providing device 100 according to one or more embodiments. The travel route providing device 100 may also have other general-purpose configurations other than the configuration illustrated in FIG. 1, and may be configured to include fewer components than the number of components illustrated in FIG. 1. Thus, the configuration of the travel route providing device 100 is not limited to the illustration and description of FIG. 1.

The travel route providing device 100 may provide a travel route of a medical diagnosis apparatus 10. That is, the travel route providing device 100 may predict and output the travel route of the portable medical diagnosis apparatus 10 so as to provide information regarding an area which a user may not be able to see beyond the medical diagnosis apparatus 10.

The medical diagnosis apparatus 10 according to one or more embodiments may include one or more moving devices 20 and may be configured as a portable-type medical diagnosis apparatus. In addition, the medical diagnosis apparatus 10 may include apparatuses according to various modalities, for example, an X-ray diagnosis apparatus, a computed tomography (CT) diagnosis apparatus, a magnetic resonance imaging (MRI) diagnosis apparatus, or an ultrasound diagnosis apparatus.

The travel route providing device 100 according to one or more embodiments may include an image capturer 110, an image processor 120, an angle measurer 130, a route predictor 140, an obstacle detector 150, a user input 160, an output 170, and a controller 180. Hereinafter, each of the components will be described in detail.

The image capturer 110 may capture an image of a space in which the medical diagnosis apparatus 10 is to be moved. The traveling space may refer a 3D space in a direction in which the medical diagnosis apparatus 10 moves. That is, the portable medical diagnosis apparatus 10, including the moving device 20, may move in various directions by a user's operation or a program within a system. Thus, the image capturer 110 may capture the image of the space in which the portable medical diagnosis apparatus 10 is to move, which is a space in the direction in which the medical diagnosis apparatus 10 moves.

The image capturer 110 according to one or more embodiments may include an imaging unit. For example, the image capturer 110 may include various types of imaging units such as a camera, an ultrahigh-speed camera, a wide viewing angle camera, or an HD camera, for example. In addition, the image capturer 110 may include a plurality of imaging units, for example, dual cameras, which are connected to each other.

Thus, the image capturer 110 may be disposed on one surface of the medical diagnosis apparatus 10 so as to capture the image of the space in which the portable medical diagnosis apparatus 10 is to move. An example of capturing the image of the space to move, by the image capturer 110 will be described in detail with reference to FIGS. 4A and 4B.

Data regarding the space in which the portable medical diagnosis apparatus 10 is to move which may be captured by the image capturer 110 may be transmitted to the image processor 120 and may be formed as an image.

The image processor 120 may generate a traveling image on the basis of the data regarding the space in which the portable medical diagnosis apparatus 10 is to move captured by the image capturer 110. The travel image, which may be an image acquired by capturing the space in which the portable medical diagnosis apparatus 10 is to move, may be a still image or a moving image. In addition, the image processor 120 may generate both a color travel image and a gray scale travel image which uses a color value. The image processor 120 may be implemented, for example, by a system on chip (SoC) including modules to perform the algorithm, or a processor to perform a program describing the algorithm, etc.

The image processor 120 according to one or more embodiments may generate a travel image by selecting any one of various image formats. That is, the image processor 120 may generate the travel image in an image format that is robust to noise, on the basis of a distance between the image processor 120 and a display 172.

The image processor 120 according to one or more embodiments may generate a stereo image from two or more pieces of image data that are received from the image capturer 110. That is, when the image capturer 110 includes dual cameras, the image processor 120 may generate a stereo image, which is a 3D image applied with perspective and a sense of depth.

The angle measurer 130 may measure a steering angle of the medical diagnosis apparatus 10. The steering angle may refer to an angle at which one or more moving devices (for example, wheels) included in the medical diagnosis apparatus 10 are directed. Although it is described in detail with reference to FIG. 5, the steering angle may refer to an angle between a direction in which the moving device of the medical diagnosis apparatus 10 is directed and a predetermined reference line. In addition, the steering angle may be within a range of −90 degrees to 90 degrees.

The angle measurer 130 may measure a direction in which the moving device 20 is moved by the medical diagnosis apparatus 10 being operated by a user, by using the steering angle. The angle measurer 130 according to one or more embodiments may include various types of angle measuring sensors, such as a rotary encoder or a gyroscope sensor. One or more embodiments will be described below with reference to FIGS. 12A and 12B.

The route predictor 140 may predict a travel route of the medical diagnosis apparatus 10. That is, the route predictor 140 may calculate and predict the travel route of the medical diagnosis apparatus 10 on the basis of the steering angle measured by the angle measurer 130.

For example, when the steering angle is determined to be 20 degrees, the route predictor 140 may determine a travel route corresponding to 20 degrees. That is, the route predictor 140 may determine a curvature corresponding to 20 degrees, and may determine a travel route having a predetermined width according to the determined curvature, as described in detail with reference to FIGS. 4A and 4B.

The route predictor 140 according to one or more embodiments may determine the width of the travel route in consideration of the size of the medical diagnosis apparatus 10 in predicting the travel route. The route predictor 140 may determine the width of the travel route according to a size of a cross-section of the medical diagnosis apparatus 10. The "cross-section" referred herein may be a cross-section at a predetermined height of the medical diagnosis apparatus 10. For example, the route predictor 140 may determine the width of the travel route according to a size of a cross-section of a lower surface of the medical diagnosis apparatus 10. One or more embodiments will be described below in detail with reference to FIG. 11.

When the steering angle is within a predetermined threshold range, the route predictor 140 according to one or more embodiments may predict the travel route as a straight-line route. For example, when the steering angle is within a range of −5 degrees to 5 degrees, the route predictor 140 may determine the travel route of the medical diagnosis apparatus 10 to be a straight-line route, which is a travel route in a case where the steering angle is 0 degrees.

Thus, the route predictor 140 may predict the travel route in consideration of an error of the steering angle due to foreign substances on a floor surface on which the medical diagnosis apparatus 10 moves. A threshold range in which the route predictor 140 may predict the travel route as a straight-line route may be changed by a user's operation or a system's internal setting.

The route predictor 140 may be implemented, for example, by a system on chip (SoC) including modules to perform the algorithm, or a processor to perform a program describing the algorithm, etc.

The obstacle detector 150 may detect an obstacle related to the travel route from the travel image. That is, the obstacle detector 150 may detect an obstacle in the travel image, which may contact the medical diagnosis apparatus 10 by the movement of the medical diagnosis apparatus 10 along the travel route. The obstacle may refer to an object that may affect the movement of the medical diagnosis apparatus 10 on the travel route. The obstacle may include various types of objects, such as a wall, a pillar, a fixed object, a moving object, or a human, etc.

The obstacle detector 150 according to one or more embodiments may detect an obstacle using color values of a plurality of pixels included in the travel image. Specifically, the travel image may include the plurality of pixels having a color value, and the obstacle detector 150 may detect a difference in color value between any one of the plurality of pixels and the adjacent pixel. That is, the obstacle detector 150 may detect and connect the pixels in which a difference in color value between the adjacent pixels is equal to or greater than a predetermined threshold value, so as to detect the obstacle on the travel image.

The obstacle detector 150 according to one or more embodiments may measure a distance between the obstacle, which is detected from the travel image, and the medical diagnosis apparatus 10. That is, the obstacle detector 150 may measure a distance between an obstacle, which may affect the movement of the medical diagnosis apparatus 10, and the medical diagnosis apparatus 10. Furthermore, the obstacle detector 150 may determine whether the measured distance is less than a predetermined threshold value.

In one or more embodiments, the obstacle detector 150 may measure a distance between an obstacle and the medical diagnosis apparatus 10 on the basis of the number of pixels included in the travel image. That is, as the number of pixels existing between the obstacle and the medical diagnosis apparatus 10 increases, a physical distance therebetween may increase, and thus the obstacle detector 150 may measure the distance therebetween in consideration of the correlation therebetween. One or more embodiments will be described below with reference to FIGS. 7 and 8.

In one or more embodiments, the obstacle detector 150 may measure a distance on the basis of image capture angles of the dual cameras. That is, when the image capturer 110 includes the dual cameras, the obstacle detector 150 may measure angles at which the two cameras are directed in order to capture the image of the space to move and may measure the distance between the medical diagnosis apparatus 10 and the obstacle on the basis of the angles. One or more embodiments will be described below with reference to FIGS. 9A and 9B.

The obstacle detector 150 may be implemented, for example, by a system on chip (SoC) including modules to perform the algorithm, or a processor to perform a program describing the algorithm, etc.

The user input 160 refers to a device for inputting data to the travel route providing device 100 by a user. Examples of the user input 160 include a keyboard, a mouse, a dome switch, a trackball, a touch pad (capacitive overlay, resistive overlay, infrared beam, surface acoustic wave, integral strain gauge, piezoelectric types, etc.), a jog wheel, a jog switch, and the like, but embodiments are not limited thereto. In particular, when the touch pad and a display panel constitute a layered structure, the layered structure may be referred to as a touch screen.

The user input 160 according to one or more embodiments may detect not only a real touch but also a proximity touch. The user input 160 may sense a touch input (for example, touching & holding, tapping, double-tapping, and flicking). In addition, the user input 160 may sense a drag input from a point at which a touch input is sensed. The user input 160 may sense a multi-touch input (for example, pinching) for at least two points.

The output 170 may output information that is processed in the travel route providing device 100. The output 170 according to one or more embodiments may include the display 172, a sound output 174, and a vibration output 176.

The display 172 may display and output information that is processed in the travel route providing device 100. For example, the display 172 may display a travel image that is generated by the image processor 120. The display 172 may display and output information regarding a travel route that is predicted by the route predictor 140, and information regarding an obstacle that is detected by the obstacle detector 150. In addition, the display 172 may display information regarding a distance between the obstacle and the medical diagnosis apparatus 10.

Furthermore, when the distance between the obstacle and the medical diagnosis apparatus 10 is detected to be less than a threshold value, the display 172 may display and output a notification message indicating that the obstacle is near. One or more embodiments will be described below with reference to FIGS. 10A to 10C.

When the display 172 and the above-mentioned touch pad constitute a layered structure so as to be configured as a touch screen, the display 172 may be used not only as an output device, but also as an input device. The display 172 may include at least one of a liquid crystal display, a thin film transistor-liquid crystal display, an organic light-emitting diode display, a flexible display, a 3D display, and an electrophoretic display, etc. The travel route providing device 100 may include two or more displays 172 according to one or more embodiments.

The sound output 174 may output a sound signal related to a function that is performed by the travel route providing device 100. For example, the sound output 174 may output a notification message as sound, which indicates that an obstacle is close to the medical diagnosis apparatus 10. The sound output 174 according to one or more embodiments may include a speaker, a buzzer, or the like.

The vibration output 176 may output a vibration signal related to a function that is processed by the travel route providing device 100. For example, when the obstacle and the medical diagnosis apparatus 10 are adjacent to each other, the vibration output 176 may output vibration to provide information to a user.

The controller 180 may control the operation of the travel route providing device 100. That is, the controller 180 may control the image capturer 110 to generate a travel image by using data captured by the image capturer 110. In addition, the controller 180 may control the route predictor 140 to predict a travel route by using a steering angle that is measured by the angle measurer 130. Furthermore, the controller 180 may control the display 172 to output information regarding the travel image and the travel route.

The controller 150 may be implemented, for example, by a system on chip (SoC) including modules to perform the algorithm, or a processor to perform a program describing the algorithm, etc.

Figure 2:
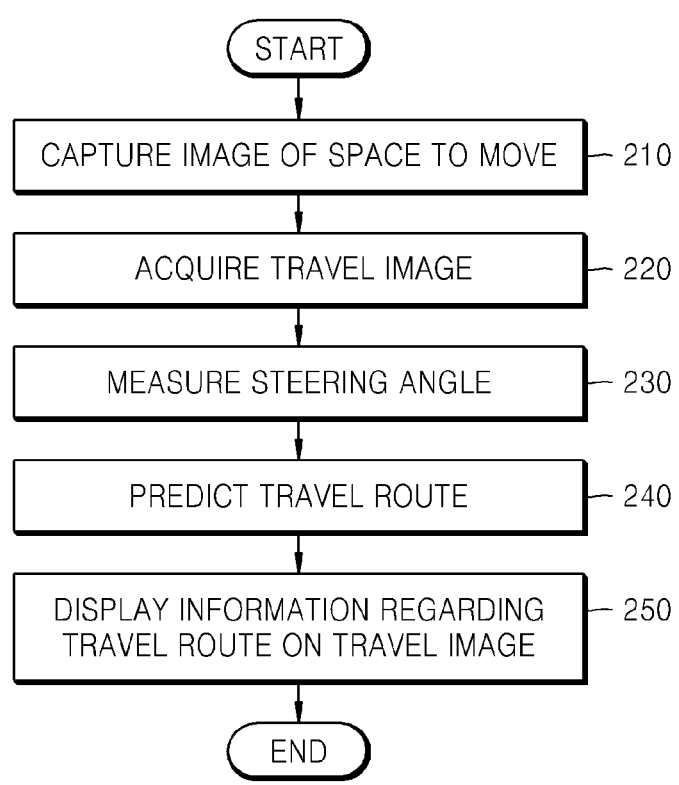
FIG. 2 is a flowchart illustrating a travel route providing method according to one or more embodiments.

FIG. 2 and FIG. 3 are flowcharts illustrating a travel route providing methods according to one or more embodiments. Each of the flowcharts shown the FIG. 2 and FIG. 3 is constituted by operations that are sequentially processed in the travel route providing device 100, the image capturer 110, the image processor 120, the angle measurer 130, the route predictor 140, the obstacle detector 150, the user input 160, the output 170, and the controller 180, which are shown in FIG. 1. Accordingly, although omitted below, a description regarding the components shown in FIG. 1 may be applied to the methods described with reference to FIG. 2 and FIG. 3.

FIG. 2 is a flowchart illustrating a travel route providing method according to one or more embodiments.

In operation 210, the travel route providing device 100 may capture an image of a space in which the medical diagnosis apparatus 10 is to be moved. That is, the travel route providing device 100 may capture the image of the space to move, which is a 3D space in a direction in which the medical diagnosis apparatus 10 moves, so as to acquire image data.

The travel route providing device 100 according to one or more embodiments may also capture the image of the space in which the medical diagnosis apparatus 10 is to be moved by using two or more imaging units in operation 210. Alternatively, the travel route providing device 100 may capture data for a stereo image by using two or more imaging units.

In operation 220, the travel route providing device 100 may acquire a travel image. That is, the travel route providing device 100 may generate the travel image by using the image data captured in operation 210.

As described above with reference to FIG. 1, the travel route providing device 100 may generate a moving image including a plurality of pixels having a color value. In addition, the travel route providing device 100 may generate an image in a format that is robust to noise and a communication channel environment.

In operation 230, the travel route providing device 100 may measure a steering angle. That is, the travel route providing device 100 may measure an angle at which the moving device 20 of the medical diagnosis apparatus 10 is directed. The travel route providing device 100 may measure a steering angle between a direction in which the moving device 20 is directed and a predetermined reference line.

As described above, the travel route providing device 100 may measure the steering angle by using an angle measuring sensor, such as rotary encoder or a gyroscope sensor, which is provided around the moving device 20.

In operation 240, the travel route providing device 100 may predict a travel route of the medical diagnosis apparatus 10. The travel route providing device 100 may determine the travel route on the basis of the steering angle measured in operation 230. That is, the travel route providing device 100 may determine the travel route having a predetermined curvature that is determined from the steering angle, and the travel route may have a width that is previously determined. In addition, the width of the travel route may be determined according to a size of a cross-section of the medical diagnosis apparatus 10.

In operation 250, the travel route providing device 100 may display information regarding the travel route on a travel image. That is, the travel route providing device 100 may display both the travel image generated in operation 220 and the information regarding the travel route that is predicted in operation 240.

The travel route providing device 100 according to one or more embodiments may display the travel image on the display 172 and may display the information regarding the travel route on the travel image in an overlapping manner. One or more embodiments relating to operation 250 will be described below with reference to FIGS. 4A and 4B.

FIG. 3 is a flowchart illustrating a travel route providing method according to one or more embodiments. FIG. 3 is a flowchart with respect to one or more embodiments after operation 210 to operation 250 that are described above with reference to FIG. 2.

In operation 310, the travel route providing device 100 may detect an obstacle in a travel image. The travel route providing device 100 according to one or more embodiments may detect the obstacle by using color values of a plurality of pixels included in the travel image, as described above with reference to FIG. 1. Specifically, the travel route providing device 100 may detect the obstacle by using a difference in color value between any one of the plurality of pixels included in the travel image and the adjacent pixel.

In operation 320, the travel route providing device 100 may display and output information regarding the obstacle. That is, the travel route providing device 100 may display and output the information regarding the obstacle on the travel image that is displayed on the display 172, as described in operation 250 of FIG. 2.

The travel route providing device 100 according to one or more embodiments may display an edge of the detected obstacle as a line, and may display the obstacle by changing color, contrast, brightness, or the like of the pixels expressing the obstacle. In addition, the travel route providing device 100 may display and output the information regarding the obstacle by flickering of the pixels corresponding to the obstacle.

In operation 330, the travel route providing device 100 may measure a distance between the medical diagnosis apparatus 10 and the obstacle. That is, the travel route providing device 100 may measure how close the obstacle detected in operation 320 is to the medical diagnosis apparatus 10.

The travel route providing device 100 according to one or more embodiments may measure the distance from the number of pixels located between two objects or from image capture angles of dual cameras, as described above with reference to FIG. 1.

The travel route providing device 100 according to one or more embodiments may measure a minimum distance between a point on a front surface of the medical diagnosis apparatus 10 and the detected obstacle by using the distance between the two objects. Alternatively, the travel route providing device 100 may measure the minimum distance between the image capturer 110 and the obstacle by using the distance between the two objects.

In operation 340, the travel route providing device 100 may determine whether the distance measured in operation 330 is less than a predetermined threshold value. When the distance is less than the predetermined threshold value, the method may proceed to operation 350. On the other hand, when the distance is equal to or greater than the predetermined threshold value, the method may proceed to operation 360. The threshold value with respect to the distance is a value that is previously set, and may vary by a user's input or a system's internal setting.

In operation 350, the travel route providing device 100 may output a notification message. That is, the travel route providing device 100 may output a notification message indicating that the obstacle approaches the medical diagnosis apparatus 10. Thus, a user may recognize that collision between the medical diagnosis apparatus 10 and the obstacle is predicted, and may operate the movement of the medical diagnosis apparatus 10 to avoid the obstacle.

The notification message according to one or more embodiments may include graphics or texts which are displayed and output to a screen, a combination thereof, sound data that is output through a speaker, or a vibration output that vibrates a portion to be touched in order for a user to operate the medical diagnosis apparatus 10 to avoid the obstacle.

In operation 360, the travel route providing device 100 may display information regarding the distance measured in operation 330 on a travel image. That is, when the measured distance is less than a threshold value, the travel route providing device 100 may display the measured distance on the travel image while displaying the notification message to a user. On the other hand, when the measured distance is equal to or greater than the threshold value, the travel route providing device 100 may display the measured distance without outputting the notification message.

The travel route providing device 100 may display and output the information regarding the measured distance as graphics, texts, or a combination thereof. In addition, the travel route providing device 100 may display the information regarding the measured distance by varying a color value according to distances. For example, as the distance decreases, the travel route providing device 100 may display the information regarding the measured distance by changing the color thereof from green to yellow and then to red.

Figure 4A:
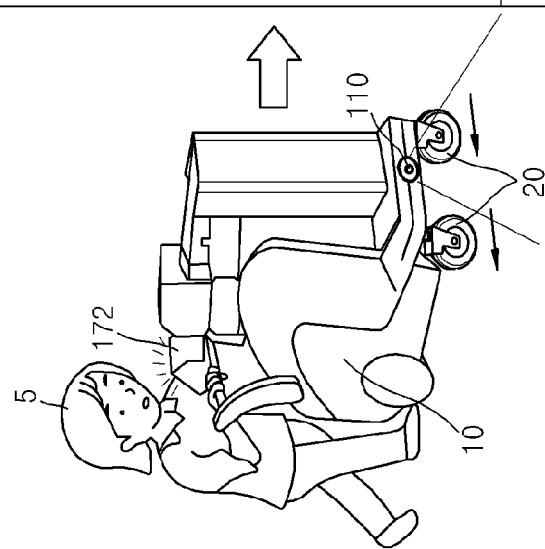
FIGS. 4A and 4B show an example in which a travel route providing device captures a traveling image and displays information regarding a travel route on the traveling image, according to one or more embodiments.
Figure 4B:
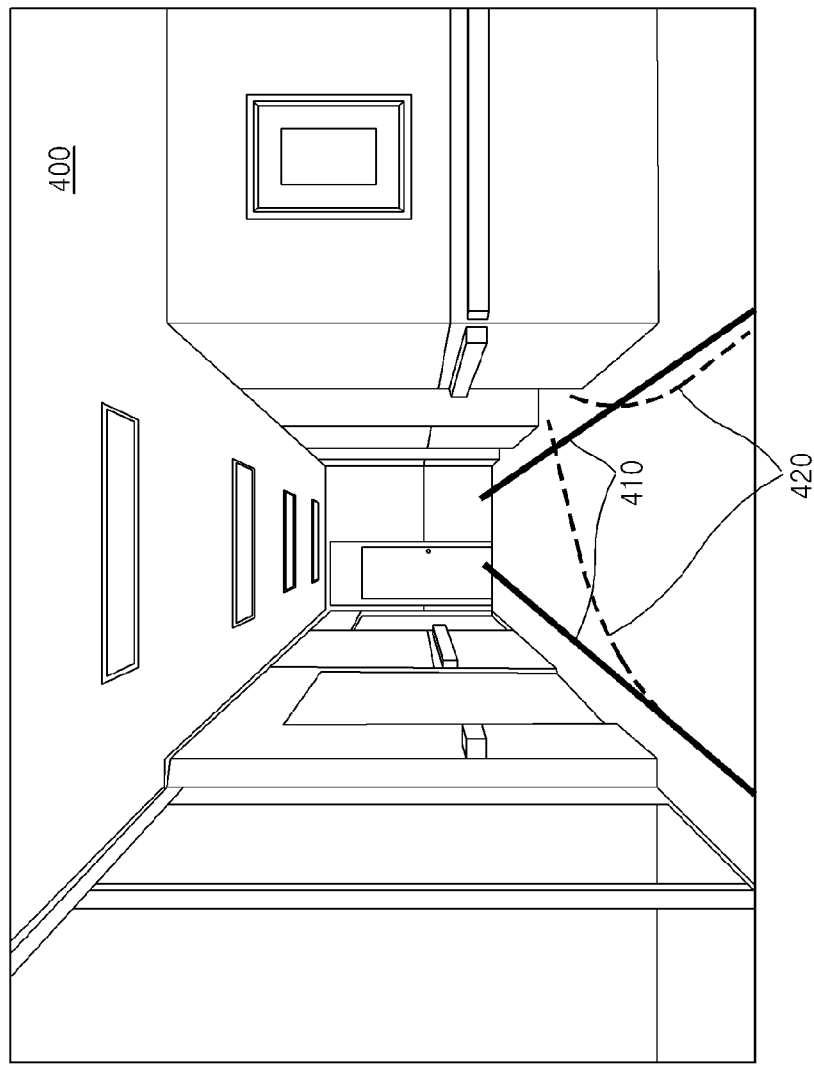

FIGS. 4A and 4B show an example in which the travel route providing device 100 captures a travel image and displays information regarding a travel route on the travel image, according to one or more embodiments. FIG. 4A shows an example of measuring a steering angle of the medical diagnosis apparatus 10 by an operation of a user 5. FIG. 4B shows an example of predicting and displaying the travel route on the basis of the steering angle.

In FIG. 4A, the image capturer 110 included in the travel route providing device 100 may capture an image of a space to move of the medical diagnosis apparatus 10. The image capturer 110 may be attached to a front surface of the medical diagnosis apparatus 10, and may capture an image of a 3D space with respect to a moving direction of the medical diagnosis apparatus 10 that is moved by an operation of the user 5.

The travel route providing device 100 may generate a travel image by capturing the image of the space in which the medical diagnosis apparatus 10 is to be moved, and the generated travel image may be output through the display 172 and may be provided to the user 5.

In FIG. 4A, the user 5 moves the medical diagnosis apparatus 10 to the right. That is, the user 5 may control the moving device 20 of the medical diagnosis apparatus 10 so that the medical diagnosis apparatus 10 is directed to move to the right by applying a force to the medical diagnosis apparatus 10 that moves straight in a front direction or by operating the medical diagnosis apparatus 10. Thus, the steering angle of the moving device 20 may vary.

FIG. 4B shows one or more embodiments regarding a travel image 400 and a travel route. First, the medical diagnosis apparatus 10 moves straight in the front direction before the user 5 controls the medical diagnosis apparatus 10 to move to the right. Thus, the travel route providing device 100 may measure the steering angle of the moving device 20 of the medical diagnosis apparatus 10 that moves straight, and may predict the travel route on the basis of the steering angle. In addition, the travel route providing device 100 may display information regarding the predicted travel route on the travel image 400. In FIG. 4B, the travel route providing device 100 may predict the travel route of the medical diagnosis apparatus 10 that moves straight, and may display the information regarding the travel route as a solid line on the travel image 400.

Subsequently, the user 5 may move the medical diagnosis apparatus 10 in the right as described above with reference to FIG. 4A. Thus, the travel route providing device 100 may sense a variation in the direction in which the moving device 20 of the medical diagnosis apparatus 10 is directed. That is, the travel route providing device 100 may measure the steering angle of the moving device 20, and may predict a new travel route on the basis of the varied steering angle.

The travel route providing device 100 may display information regarding the predicted new travel route on the travel image 400. That is, as shown in FIG. 4B, the travel route providing device 100 may display a new travel route as a dashed line 420, which is changed from a current travel route shown as a solid line 410.

As shown in FIGS. 4A and 4B, the travel route providing device 100 may predict the travel route on the basis of the steering angle of the medical diagnosis apparatus 10, and may display the travel route on the travel image in an overlapping manner. Thus, the user may ascertain the travel route together with an image regarding a blind zone of the medical diagnosis apparatus 10, thereby effectively controlling the medical diagnosis apparatus 10.

According to one or more embodiments, when the steering angle is within a threshold range, the travel route providing device 100 may predict the travel route as a straight-line route. That is, when the steering angle varies within a predetermined range due to friction against a floor surface on which the medical diagnosis apparatus 10 moves or unevenness of the floor surface, the travel route providing device 100 may recognize the steering angle as being within an error range. That is, the travel route providing device 100 may predict the travel route as a straight-line route, that is, as a path in a case where the steering angle is 0 degrees.

According to one or more embodiments, the travel route providing device 100 may reduce the burden of predicting the travel route according to the steering angle that frequently and minutely varies. In addition, the range of the above-mentioned threshold range of the steering angle may vary by a user's input and a system's setting.

Figure 5:
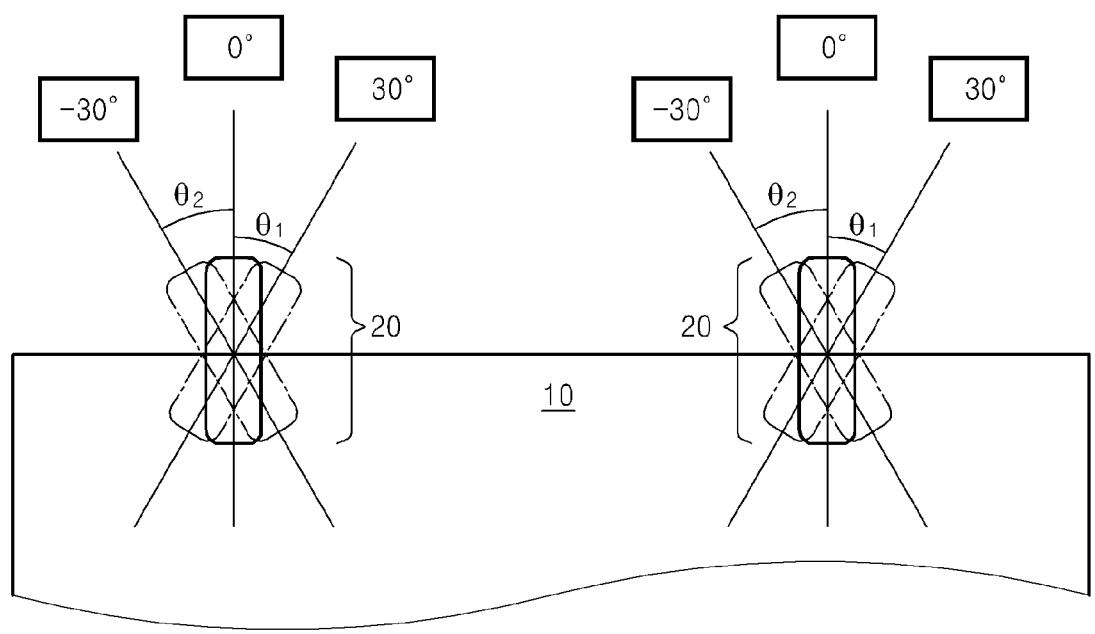
FIG. 5 is a diagram showing an example of measuring a steering angle according to one or more embodiments.

FIG. 5 is a diagram showing an example of measuring a steering angle according to one or more embodiments. FIG. 5 is a plan view seen from above the medical diagnosis apparatus 10. In FIG. 5, a quadrangle on the lower side shows a main body of the medical diagnosis apparatus 10, and two symmetrical quadrangles respectively shown on the left and right sides show the moving device 20 of the medical diagnosis apparatus 10.

First, a case where the steering angle is 0 degrees will be described. When the user 5 controls the medical diagnosis apparatus 10 to move in a front direction, the two moving devices 20 may face the front direction, and the steering angle may be 0 degrees. Thus, the travel route providing device 100 may measure the steering angle that is 0 degrees, and may predict the travel route as a straight-line route.

As described above with reference to FIG. 1, the steering angle is an angle between the direction in which the moving device 20 is directed and a reference line. That is, the reference line shown in FIG. 5 may relatively vary according to positions of the reference line, and the description with respect to FIG. 5 is just an example for convenience of description.

As described above with reference to FIG. 4, when the steering angle included within a predetermined threshold range is measured, the travel route providing device 100 may predict the travel route as a straight-line route even with respect to the steering angle having a value other than 0 degrees. For example, the travel route providing device 100 may predict the travel route as a straight-line route with respect to the steering angle of −5 degrees to 5 degrees.

Next, a case where the steering angle is 30 degrees will be described. The user 5 may control the medical diagnosis apparatus 10 to move to the right, and the travel route providing device 100 may measure steering angles of the two moving devices 20. The two moving devices 20 may be directed in a direction having an angle corresponding to θ1 from the reference line, that is, from the moving direction in the case where the steering angle is 0 degrees. Thus, the travel route providing device 100 may measure the steering angle θ1.

When θ1 is 30 degrees, the travel route providing device 100 may measure the steering angle that is 30 degrees, and may predict and display the travel route corresponding to 30 degrees. That is, the travel route providing device 100 may set a curved line having a curvature corresponding to 30 degrees, and may determine the travel route having a predetermined width.

Next, a case where the steering angle is −30 degrees will be described. When the user 5 controls the medical diagnosis apparatus 10 to move to the left, the two moving devices 20 may be directed to a direction (that is, to the left) having an angle corresponding to θ2 from the reference line. Thus, the travel route providing device 100 may measure the steering angle θ2.

When the steering angle is measured as −30 degrees, the travel route providing device 100 may predict the travel route corresponding to −30 degrees and may display the travel route on the travel image. In addition, the travel route providing device 100 may predict the travel route to the left which corresponds to −30 degrees and may provide the travel route to the user 5.

Figure 6:
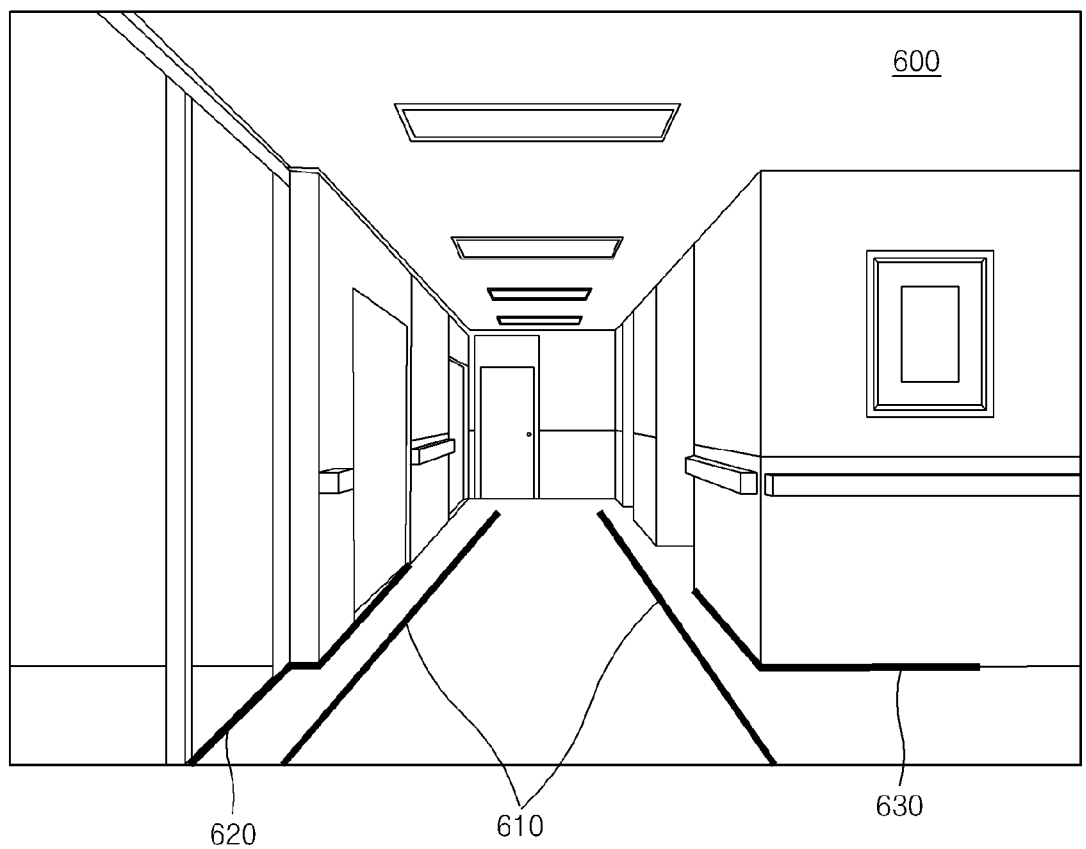
FIG. 6 is a diagram illustrating an example of detecting an obstacle in a traveling image and displaying the obstacle, according to one or more embodiments.

FIG. 6 is a diagram illustrating an example of detecting an obstacle in a travel image 600 and displaying the obstacle, according to one or more embodiments.

First, the travel route providing device 100 may display the travel image 600 on the display 172. In addition, the travel route providing device 100 may display a travel route 610, which is predicted on the basis of a steering angle of the medical diagnosis apparatus 10, on the travel image 600.

The travel route providing device 100 may detect an obstacle, which is an object that may affect the movement of the medical diagnosis apparatus 10, from the travel image 600. As described above with reference to FIG. 1, the travel route providing device 100 may detect various objects such as, for example, a wall, a pillar, a fixed object, or a moving object, etc., and may detect the objects by using color values of a plurality of pixels of the travel image 600.

As shown in FIG. 6, the travel route providing device 100 may detect a pillar and a wall as obstacles from the travel image 600. That is, the travel route providing device 100 may detect a boundary line between a pillar shown on the right side of the travel image 600 and the floor and a boundary line between a wall shown on the left side of the travel image 600 and the floor, as obstacles.

Furthermore, the travel route providing device 100 may output information regarding the detected obstacles to the travel image 600. As shown in FIG. 6, the travel route providing device 100 may display and output an obstacle 620 at the boundary line between the wall and the floor and an obstacle 630 at the boundary line between the pillar and the floor on the travel image 600.

The travel route providing device 100 according to one or more embodiments may detect a pixel in which a difference in color value from the adjacent pixel is equal to or greater than a threshold value, as an obstacle pixel, in a plurality of pixels included in the travel image 600. That is, in FIG. 6, the travel route providing device 100 may detect color values of the pixel for the wall and the pixel for the floor, and may determine whether a difference between the color values is equal to or greater than the threshold value.

Then, when the difference between the color values is equal to or greater than the threshold value, the travel route providing device 100 may detect a boundary between the two pixels as an obstacle. Similarly, the travel route providing device 100 may detect a boundary between two objects as an obstacle according to whether the difference between the color values is equal to or greater than the threshold value.

A process of detecting the obstacle is not limited to the above description, and the travel route providing device 100 may detect the obstacle by using various boundary detection algorithms and image analysis algorithms.

Meanwhile, the travel route providing device 100 may display information regarding the two obstacles 620 and 630 on the travel image 600 so as to be visually distinguished from the information regarding the travel route 610. That is, the travel route providing device 100 may display color values of the travel route 610 and the two obstacles 620 and 630 differently from each other, or may vary contrast, chroma, and the like. Thus, the travel route providing device 100 may provide the information regarding the travel route and the information regarding the obstacle so as not to be confused with each other.

Figure 7:
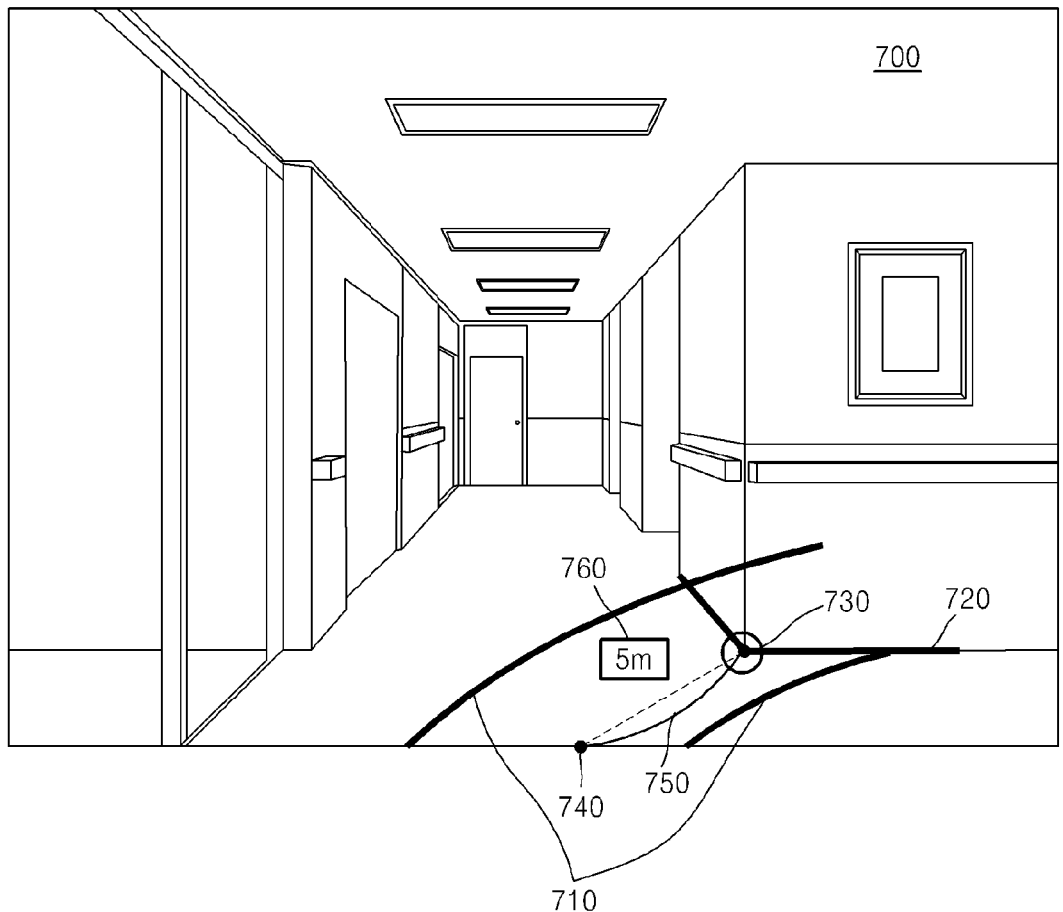
FIG. 7 is a diagram illustrating an example of measuring a distance between a medical diagnosis apparatus and an obstacle and displaying the distance, according to one or more embodiments.

FIG. 7 is a diagram illustrating an example of measuring a distance between the medical diagnosis apparatus 10 and an obstacle and displaying the distance, according to one or more embodiments.

In FIG. 7, the travel route providing device 100 may measure a steering angle of the medical diagnosis apparatus 10, and may display information regarding a travel route 710 that may be predicted according to the steering angle. In FIG. 7, as the medical diagnosis apparatus 10 moves to the right, the travel route providing device 100 may display the travel route 710 on the travel image 700 to the right.

Then, the travel route providing device 100 may detect an obstacle 720 on the travel image 700. The travel route providing device 100 may detect a boundary between a pillar to the right and the floor as the obstacle 720, and may display information regarding the obstacle 720 on the travel image 700. As described above with reference to FIG. 6, the travel route providing device 100 may display information regarding the obstacle 720 and information regarding the travel route 710 so as to be visually distinguished from each other.

As shown in FIG. 7, since there is an obstacle on the travel route 710 according to the steering angle, the travel route providing device 100 may provide information to the user indicating the obstacle 720.

The travel route providing device 100 may measure and display a distance between the medical diagnosis apparatus 10 and the obstacle 720. The travel route providing device 100 according to one or more embodiments may set a central point 740 on an edge on the lower side of the travel image 700 to be a reference point of the medical diagnosis apparatus 10. In addition, the travel route providing device 100 may set a position 730 of the obstacle 720 which is closest to the central point 740 to be a reference point for measuring a distance. In other words, the travel route providing device 100 may measure a distance between the central point 740 and the position 730 of the obstacle 720 that is closest to the central point 740 to be a distance between the medical diagnosis apparatus 10 and the obstacle 720.

As shown in FIG. 7, the travel route providing device 100 may measure a distance 750 between the medical diagnosis apparatus 10 and the obstacle 720 to be 5 m. Then, the travel route providing device 100 may display information 760 regarding the measured distance 750 that is 5 m, on the travel image 700.

Hereinafter, a detailed example in which the travel route providing device 100 measures a distance will be described with reference to FIG. 8, FIG. 9A, and FIG. 9B.

Figure 8:
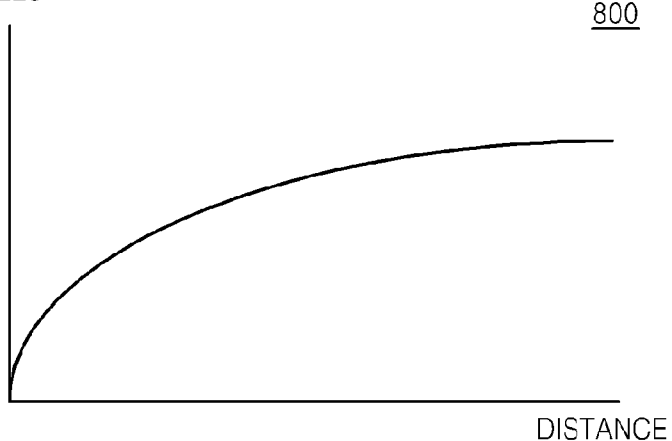
FIG. 8 is a graph illustrating an example of measuring a distance between a medical diagnosis apparatus and an obstacle in accordance with the number of pixels, according to one or more embodiments.

FIG. 8 is a graph 800 illustrating an example of measuring a distance between a medical diagnosis apparatus and an obstacle in accordance with the number of pixels, according to one or more embodiments. The graph 800 of FIG. 8 shows the number of pixels matched with the measured distance.

First, as described above with reference to FIG. 7, the travel route providing device 100 may measure a distance on the basis of the number of pixels on the travel image 700. The travel route providing device 100 may measure the number of pixels connecting the central point 740 and the position 730. Subsequently, the travel route providing device 100 may determine a physical distance matched with the measured number of pixels to be a distance between the medical diagnosis apparatus 10 and the obstacle 720. The travel route providing device 100 may previously store information regarding a relation between the number of pixels and the distance.

As a distance from the medical diagnosis apparatus 10 increases, the number of pixels on the travel image 700, which correspond to the same physical distance, is decreased. For example, when the distance from the medical diagnosis apparatus 10 is matched with ten pixels with respect to a range between 0 m and 1 m, a range between 5 m and 6 m, which is a range corresponding to the same distance of 1 m, may be expressed by three pixels.

In other words, increasing amounts the number of pixels, which is required in order to express the increased physical distance on the travel image 700, is decreased as the measured distance from the medical diagnosis apparatus 10 uniformly increases. This is based on perspective for expressing an object having a sense of distance on a plane.

In one or more embodiments, the travel route providing device 100 may store information regarding a non-linear relationship between the distance and the number of pixels shown in the graph 1880 of FIG. 8. Then, the travel route providing device 100 may calculate and display a distance between the medical diagnosis apparatus 10 and the obstacle 720 by the number of pixels being measured in the travel image 700.

Figure 9B:
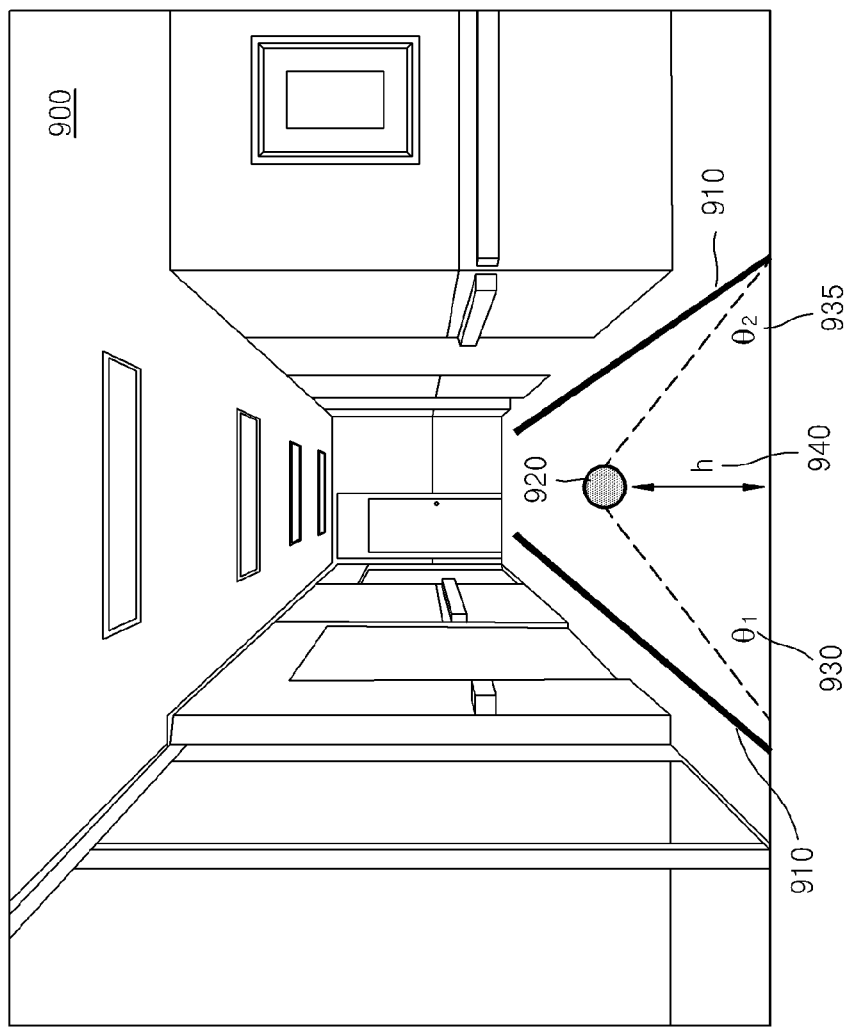
FIGS. 9A and 9B are diagram illustrating an example in which dual cameras measure a distance, according to one or more embodiments.
Figure 9A:
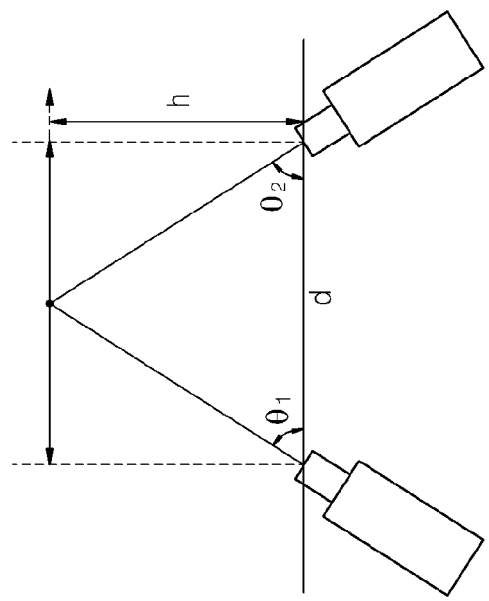

FIGS. 9A and 9B are diagrams illustrating an example in which dual cameras measure a distance, according to one or more embodiments. FIG. 9A illustrates a method in which dual cameras measure a distance. FIG. 9B illustrates a method in which dual cameras measure a distance in a travel image 900.

As described above with reference to FIG. 1, the image capturer 110 of the travel route providing device 100 may include dual cameras. The dual cameras are imaging units that capture an image of the same object at different positions in a three-dimensional manner, and the travel route providing device 100 may generate a stereo image from data of the image captured using the dual cameras.

In FIG. 9A, the dual cameras that may be located separated from each other by a distance "d" may respectively determine image capture angles θ1 and θ2 that are angles at which the dual cameras are directed to the same object. The travel route providing device 100 may calculate a distance "h" between the dual cameras and an object by using the image capture angles θ1 and θ2. A relationship between d, h, θ1, and θ2 according to one or more embodiments may be expressed as the following Expression 1:

$$h = \frac{d}{\{(\tan(90° - \theta 1)) + (\tan(90° - \theta 2))\}} \quad (1)$$

In Expression 1, the image capture angles θ1 and θ2 are different angles from the steering angle described above with reference to FIG. 5.

In FIG. 9B, the travel route providing device 100 may measure a distance between the medical diagnosis apparatus 10 and a position 920 on the travel image 900 by using Expression 1 described above. That is, the travel route providing device 100 may use values of a θ1 930 and a θ2 935, which are the image capture angles of the dual cameras, in order to measure an "h" 940 which is a distance between the dual cameras and the position 920 on a travel route 910.

FIG. 9B shows that the travel route providing device 100 may measure a distance from any one point on the travel route 910. However, the travel route providing device 100 may measure a distance between the medical diagnosis apparatus 10 and an obstacle located on the travel route as described above with reference to FIG. 7, by using the above-described embodiments.

FIGS. 10A to 10C are diagrams illustrating an example of outputting a notification message when a distance having a value equal to or less than a threshold value is measured, according to one or more embodiments. FIG. 10A shows an example of displaying the notification message on a travel image 1000. FIG. 10B shows an example of outputting the notification message as a sound. FIG. 100 shows an example of outputting the notification message via vibration.

First, the travel route providing device 100 may display a travel route 1010 on the travel image 1000. Then, the travel route providing device 100 may sense an obstacle 1020 in the travel image 1000, and may measure a distance 1050 between a central point 1040 and a position 1030. Subsequently, the travel route providing device 100 may display and output information 1060 regarding the measured distance 1050, which is 2 m, on the travel image 1000.

In FIG. 10A, the travel route providing device 100 may ascertain whether the measured distance 1050 is less than a threshold value. The travel route providing device 100 according to one or more embodiments may set the threshold value to be 3 m. However, 3 m is just a numerical value for convenience of description, and is not limited thereto. The travel route providing device 100 may change the threshold value with respect to the distance by a user's input or a system's setting.

Subsequently, when the measured distance 1050 is less than a threshold value that is previously determined, the travel route providing device 100 may display a notification message 1070 indicating that the medical diagnosis apparatus 10 has approached the obstacle 1020. That is, the travel route providing device 100 may display the notification message 1070 indicating that the medical diagnosis apparatus 10 needs to be controlled to avoid collision with the obstacle 1020 since the user 5 has approached the obstacle 1020.

The travel route providing device 100 according to one or more embodiments may make the notification message 1070 flicker or may display the notification message 1070 by varying color or brightness with time. That is, the travel route providing device 100 may display the notification message 1070 by using various visual effects so as to be distinguished from the travel image 1000.

In FIG. 10B, the travel route providing device 100 may output a notification message as a sound. That is, the travel route providing device 100 may output the notification message as a sound by using various types of pieces of sound data that are previously stored, for example, a warning sound, a beep sound, or voice data. As shown in FIG. 10B, the travel route providing device 100 may output a notification message of "Obstacle located 2 m ahead".

In FIG. 10C, the travel route providing device 100 may output a notification message via vibration. For example, the travel route providing device 100 may output the notification message by vibrating a handle of the medical diagnosis apparatus 10 that the user 5 touches.

According to the description regarding FIGS. 10A to 10C, the travel route providing device 100 may output the notification message by using various output manners. In addition, the travel route providing device 100 may output the notification message by simultaneously using one or more output manners from the output of an image, the output of a sound, and the output of vibration.

Figure 11:
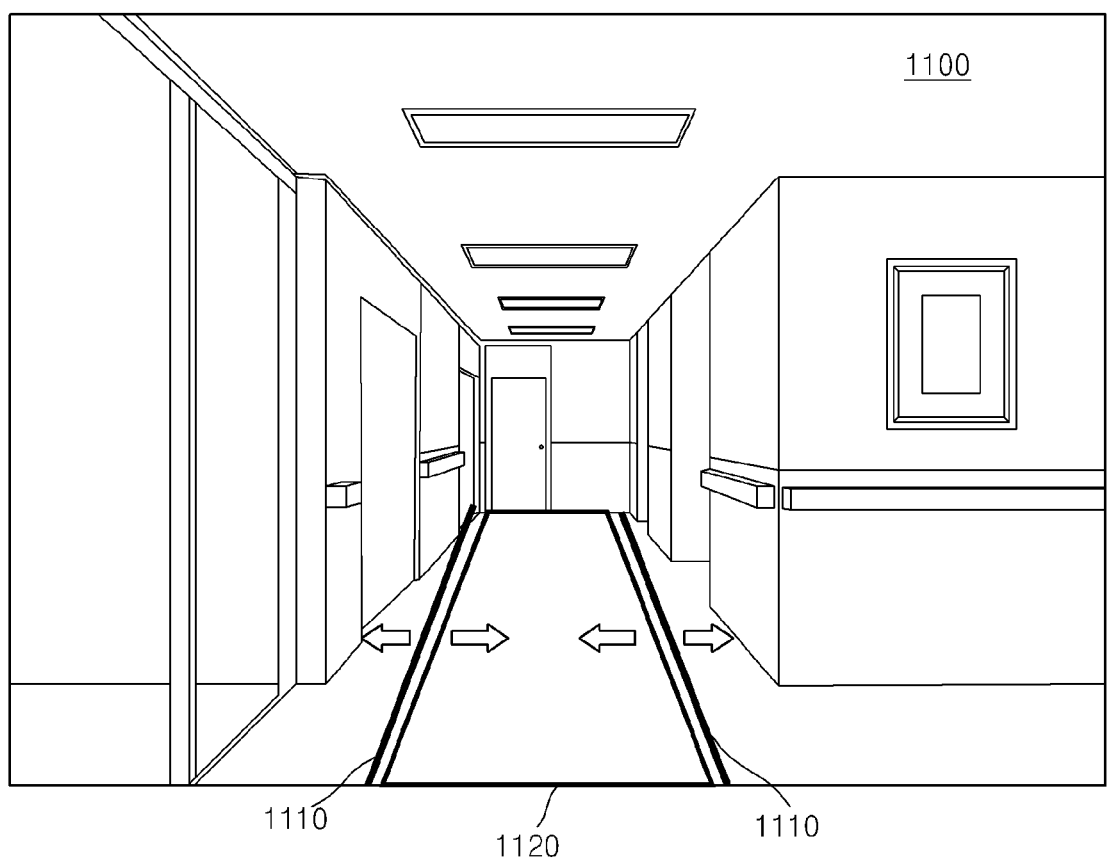
FIG. 11 is a diagram illustrating the determination of a width of a travel route, according to an one or more embodiments.

FIG. 11 is a diagram illustrating the determination of a width of a travel route, according to one or more embodiments.

The travel route providing device 100 may determine a travel route 1110 on the basis of a steering angle of the medical diagnosis apparatus 10. In addition, the route providing device 100 may display information regarding the travel route 1110 on a travel image 1100. The travel route providing device 100 may determine a width of the travel route 1110 on the basis of the size of the medical diagnosis apparatus 10 in determining the travel route 1110.

Referring to FIG. 11, the travel route providing device 100 may determine the width of the travel route 1110 in consideration of the size of a cross-section 1120 of the medical diagnosis apparatus 10. As described above with reference to FIG. 1, the cross-section 1120 may be a cross-section of the medical diagnosis apparatus 10 at a predetermined height.

For example, the cross-section 1120 in FIG. 11 may be the bottom surface of the medical diagnosis apparatus 10. Alternatively, the cross-section 1120 in FIG. 11 may be a cross-section of the medical diagnosis apparatus 10 that has a largest area at a predetermined height. Thus, the travel route providing device 100 may determine a cross-section that is most likely to collide with an obstacle to be the cross-section 1120 of FIG. 11.

The travel route providing device 100 may determine the width of the travel route 1110 on the basis of the size of the cross-section 1120 which is shown in FIG. 11. That is, the travel route providing device 100 may determine the width of the travel route 1110 to be large when the medical diagnosis apparatus 10 has a large size, and may determine the width of the travel route 1110 to be small when the medical diagnosis apparatus 10 has a small size.

Meanwhile, the travel route providing device 100 may determine the cross-section 1120 of the medical diagnosis apparatus 10 on the basis of a user's input. That is, the travel route providing device 100 may receive a user's input for inputting the size of the medical diagnosis apparatus 10 and may determine the cross-section 1120 on the basis of the user's input.

According to FIG. 11, a user may recognize the possibility of collision between the medical diagnosis apparatus 10 and an obstacle more intuitionally and realistically.

FIGS. 12A and 12B are diagrams illustrating an example of the moving device 20 and the angle measurer 130, according to one or more embodiments. FIG. 12A shows an example where a rotary encoder 1210 is provided around the moving device 20. FIG. 12B shows an example where a gyroscope sensor 1220 is provided around the moving device 20.

The travel route providing device 100 according to one or more embodiments may measure a steering angle of the medical diagnosis apparatus 10. As described above with reference to FIG. 1, the travel route providing device 100 may measure the steering angle through the angle measurer 130 provided around the moving device 20 of the medical diagnosis apparatus 10. Hereinafter, one or more embodiments regarding the angle measurer 130 will be described.

In FIG. 12A, the angle measurer 130 of the travel route providing device 100 may include a rotary encoder 1210. The angle measurer 130 according to one or more embodiments may include at least one of an absolute rotary encoder and an incremental rotary encoder.

The rotary encoder 1210 may be provided around the moving device 20 of the medical diagnosis apparatus 10 so as to generate light through a light-emitting element and to detect the generated light through a light-detecting element. The travel route providing device 100 according to one or more embodiments may measure a steering angle of the moving device 20 by light detected through a slit.

In FIG. 12B, the angle measurer 130 of the travel route providing device 100 includes the gyroscope sensor 1220. The angle measurer 130 according to one or more embodiments may measure a steering angle of the moving device 20 through the gyroscope sensor 1220.

The location of the gyroscope sensor 1220, which is shown in FIG. 12B, is just an example for convenience of description. That is, the gyroscope sensor 1220 included in the travel route providing device 100 may be disposed at other different locations around the moving device 20.

A method of measuring the steering angle is not limited as illustrated in FIG. 12. The travel route providing device 100 may include various types of angle measurers in addition to those described in the above-described embodiments.

According to the method and device for providing a travel route, which are described above, a user who moves a medical diagnosis apparatus may smoothly secure a view in a moving direction of the medical diagnosis apparatus. Furthermore, the user may visually ascertain a travel route and may ascertain the presence or absence of an obstacle and a distance to an obstacle, and thus the user may effectively control the medical diagnosis apparatus.

In one or more embodiments, any apparatus, system, element, or interpretable unit descriptions herein include one or more hardware devices or hardware processing elements. For example, in one or more embodiments, any described apparatus, system, element, retriever, pre or post-processing elements, tracker, detector, encoder, decoder, etc., may further include one or more memories and/or processing elements, and any hardware input/output transmission devices, or represent operating portions/aspects of one or more respective processing elements or devices. Further, the term apparatus should be considered synonymous with elements of a physical system, not limited to a single device or enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include: magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be any defined, measurable, and tangible distributed network, so that the computer readable code is stored and executed in a distributed fashion. Still further, as only an example, the processing element could include a processor or a computer processor, and processing elements may be distributed and/or included in a single device.

The computer-readable media may also be embodied in at least one application specific integrated circuit (ASIC) or Field Programmable Gate Array (FPGA), as only examples, which execute (e.g., processes like a processor) program instructions.

While aspects of the present invention have been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. A method of providing a travel route of a mobile medical diagnosis apparatus, the method comprising:
   acquiring a travel image by capturing an image of a space in which the mobile medical diagnosis apparatus is to be moved;
   predicting an original travel route of the mobile medical diagnosis apparatus based on a steering angle of the mobile medical diagnosis apparatus, the predicting of the original travel route comprising determining a width of the original travel route based on a cross-section of the mobile medical diagnosis apparatus and determining the original travel route as a straight-line route when the steering angle is within a threshold range, wherein the threshold range is determined by a user input;
   displaying the original travel route on the travel image in an overlapping manner;
   detecting a change in the steering angle;
   generating an updated travel route by updating the original travel route based on the changed steering angle;
   displaying the updated travel route on the travel image in an overlapping manner;
   detecting an obstacle related to the original travel route; and
   displaying, on the travel image, the obstacle by highlighting an edge of the obstacle as a line, by changing at least one of color, contrast, and brightness of pixels corresponding to the obstacle, or by flickering pixels corresponding to the obstacle.

2. The method of claim 1, further comprising:
   displaying information regarding the obstacle on the travel image in an overlapping manner.

3. The method of claim 2, wherein the detecting of the obstacle comprises detecting pixels in which a difference in color value between the adjacent pixels is equal to or greater than a predetermined threshold value, in a plurality of pixels.

4. The method of claim 2, further comprising:
   measuring a distance between the mobile medical diagnosis apparatus and the obstacle; and
   displaying information regarding the measured distance on the travel image.

5. The method of claim 4, wherein the measuring of the distance comprises measuring the distance based on a number of pixels located between the mobile medical diagnosis apparatus and the obstacle, in the travel image.

6. The method of claim 4, wherein the measuring of the distance comprises measuring the distance based on image capture angles of two cameras that capture the image of the space in which the mobile medical diagnosis apparatus is to move.

7. The method of claim 4, further comprising outputting a notification message indicating that the mobile medical diagnosis apparatus has approached the obstacle when a distance is less than the predetermined threshold value.

8. The method of claim 1, wherein the steering angle is measured using at least one of a rotary encoder and a gyroscope sensor which are provided on a moving device of the mobile medical diagnosis apparatus.

9. The method of claim 1, wherein the predicting of the travel route comprises determining a width of the travel route based on a size of the mobile medical diagnosis apparatus.

10. The method of claim 1, wherein displaying the updated travel route on the travel image comprises simultaneously displaying the updated travel route and the original travel route in a visually different manner.

11. A device for providing a travel route of a mobile medical diagnosis apparatus, the device comprising:
    an image capturer to capture an image of a space in which the mobile medical diagnosis apparatus is to be moved;
    an image processor to acquire a travel image obtained from the captured image;
    an angle measurer to measure a steering angle of the mobile medical diagnosis apparatus;
    a route predictor to predict an original travel route of the mobile medical diagnosis apparatus based on the steering angle, the route predictor predicting the original travel route by determining a width of the original travel route on the basis of a cross-section of the mobile medical diagnosis apparatus and by determining the original travel route as a straight-line route when the steering angle is within a threshold range, wherein the threshold range is determined by a user input;
    an obstacle detector to detect an obstacle related to the travel route; and
    an output to display the original travel route on the travel image in an overlapping manner;
    wherein the route predictor is configured to generate an updated travel route by updating the original travel route based on a change in the steering angle measured by the angle measurer, and wherein the output is configured to display the updated travel route on the travel image in an overlapping manner, and
    wherein the output displays, on the travel image, the obstacle by highlighting an edge of the obstacle as a line, by changing at least one of color, contrast and brightness of pixels corresponding to the obstacle, or by flickering pixels corresponding to the obstacle.

12. The device of claim 11, further
    wherein the output displays information regarding the obstacle on the travel image.

13. The device of claim 12, wherein the obstacle detector detects pixels in which a difference in color value between the adjacent pixels is equal to or greater than a predetermined threshold value, in a plurality of pixels.

14. The device of claim 12, wherein the obstacle detector measures a distance between the mobile medical diagnosis apparatus and the obstacle, and the output displays information regarding the measured distance on the travel image.

15. The device of claim 11, wherein the angle measurer is provided on a moving device of the mobile medical diagnosis apparatus and comprises at least one of a rotary encoder and a gyroscope sensor.

16. The device of claim 11, wherein the route predictor determines a width of the travel route based on a size of the mobile medical diagnosis apparatus.

17. The device of claim 11, wherein the output is configured to simultaneously display the updated travel route and the original travel route in a visually different manner.

18. A non-transitory computer-readable recording medium having embodied thereon a computer program to execute a method of providing a travel route of a mobile medical diagnosis apparatus, the method comprising:
    acquiring a travel image by capturing an image of a space in which the mobile medical diagnosis apparatus is to be moved;
    predicting an original travel route of the mobile medical diagnosis apparatus based on a steering angle of the mobile medical diagnosis apparatus, the predicting of the original travel route comprising determining a width of the original travel route based on a cross-section of the mobile medical diagnosis apparatus and determining the original travel route as a straight-line route when the steering angle is within a threshold range, wherein the threshold range is determined by a user input;

displaying the original travel route on the travel image in an overlapping manner;

detecting a change in the steering angle;

generating an updated travel route by updating the original travel route based on the changed steering angle;

displaying the updated travel route on the travel image in an overlapping manner;

detecting an obstacle related to the travel route; and displaying, on the travel image, the obstacle by highlighting an edge of the obstacle as a line, by changing at least one of color, contrast and brightness of pixels corresponding to the obstacle, or by flickering pixels corresponding to the obstacle.

19. A device for providing a travel route of a mobile medical diagnosis apparatus, the device comprising:

an angle measurer to measure a steering angle of the mobile medical diagnosis apparatus;

a route predictor to predict an original travel route of the mobile medical diagnosis apparatus based on the steering angle, the route predictor to predict the original travel route by determining a width of the original travel route on the basis of a cross-section of the mobile medical diagnosis apparatus and by determining the original travel route as a straight-line route when the steering angle is within a threshold range, wherein the threshold range is determined by a user input;

an obstacle detector to detect an obstacle related to the travel route; and an output to display the original travel route on a travel image in an overlapping manner;

wherein the route predictor is configured to generate an updated travel route by updating the original travel route based on a change in the steering angle measured by the angle measurer, and wherein the output is configured to display the updated travel route on the travel image in an overlapping manner, and wherein the output displays, on the travel image, the obstacle by highlighting an edge of the obstacle as a line, by changing at least one of color, contrast and brightness of pixels corresponding to the obstacle, or by flickering pixels corresponding to the obstacle.

20. The device of claim 19, further comprising:

an image capturer to capture an image of a space in which the mobile medical diagnosis apparatus is to move; and an image processor to acquire the travel image obtained from the captured image, wherein the output displays information regarding the original travel route and the obstacle on the travel image.

21. The device of claim 20, wherein the obstacle detector measures a distance between the mobile medical diagnosis apparatus and the obstacle, and the output displays information regarding the measured distance on the travel image in an overlapping manner.

22. The device of claim 21, wherein the output outputs a notification message indicating that the mobile medical diagnosis apparatus has approached the obstacle when the distance is less than a predetermined threshold value.

* * * * *